(12) United States Patent
Furtwangler et al.

(10) Patent No.: US 11,169,672 B2
(45) Date of Patent: Nov. 9, 2021

(54) STYLING SYSTEM

(71) Applicant: Home Box Office, Inc., New York, NY (US)

(72) Inventors: Brandon C. Furtwangler, Issaquah, WA (US); Brendan Joseph Clark, Seattle, WA (US); J. Jordan C. Parker, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 16/866,750

(22) Filed: May 5, 2020

(65) Prior Publication Data

US 2020/0264749 A1    Aug. 20, 2020

Related U.S. Application Data

(63) Continuation of application No. 14/843,810, filed on Sep. 2, 2015, now Pat. No. 10,671,252.

(60) Provisional application No. 62/046,142, filed on Sep. 4, 2014.

(51) Int. Cl.
*G06F 3/048* (2013.01)
*G06F 3/0484* (2013.01)
*G06F 8/38* (2018.01)
*G06F 9/451* (2018.01)
*G06F 40/154* (2020.01)

(52) U.S. Cl.
CPC ............ *G06F 3/0484* (2013.01); *G06F 8/38* (2013.01); *G06F 9/451* (2018.02); *G06F 40/154* (2020.01)

(58) Field of Classification Search
CPC .................................................. G06F 40/40
See application file for complete search history.

(56) References Cited

U.S. PATENT DOCUMENTS

| 6,016,514 | A | 1/2000 | Cink et al. |
|---|---|---|---|
| 9,239,820 | B1 | 1/2016 | Marks et al. |
| 9,626,080 | B1 * | 4/2017 | Labaj .......................... G06F 3/00 |
| 2001/0026272 | A1 | 10/2001 | Feld et al. |
| 2002/0184612 | A1 | 12/2002 | Hunt et al. |
| 2003/0137539 | A1 | 7/2003 | Dees |
| 2004/0075684 | A1 | 4/2004 | Charter et al. |
| 2005/0091584 | A1 | 4/2005 | Bogdam et al. |
| 2005/0183008 | A1 | 8/2005 | Crider et al. |
| 2005/0234884 | A1 | 10/2005 | Drukman et al. |

(Continued)

OTHER PUBLICATIONS

International Search Report and Written Opinion from International Patent Application Serial No. PCT/US15/48409, dated Dec. 1, 2015, 15 pages.

(Continued)

*Primary Examiner* — Di Xiao
(74) *Attorney, Agent, or Firm* — Amin, Turocy & Watson, LLP

(57) ABSTRACT

The described technology is directed towards determining the rendering of user interface (UI) elements, referred to as views, based upon styles, in which styles comprise property values such as color value data, font data, border data, position data, and/or animation-related data applied to a view. A view object instance is returned upon request based upon an identifier that is used to select an unstyled view object and a style applied to that view object. The styles may be maintained as a fixed set of styles for a runtime session.

20 Claims, 11 Drawing Sheets

(56) References Cited

U.S. PATENT DOCUMENTS

| | | |
|---|---|---|
| 2005/0283537 A1 | 12/2005 | Li et al. |
| 2006/0085745 A1 | 4/2006 | Anderson et al. |
| 2006/0200760 A1 | 9/2006 | Sellers et al. |
| 2007/0162848 A1 | 7/2007 | Mansfield et al. |
| 2008/0282166 A1 | 11/2008 | Fillman et al. |
| 2009/0319337 A1 | 12/2009 | Xie |
| 2010/0005105 A1 | 1/2010 | Zhang et al. |
| 2013/0173040 A1 | 7/2013 | Wells et al. |
| 2013/0259308 A1 | 10/2013 | Klusza et al. |
| 2014/0188907 A1 | 7/2014 | Benchenna et al. |
| 2014/0365965 A1 | 12/2014 | Bray et al. |

OTHER PUBLICATIONS

Anonymous: "View: Android Developers," Apr. 10, 2014, 84 pages.

Non-Final Office Action received for U.S. Appl. No. 14/843,810 dated Mar. 12, 2018, 41 pages.

Final Office Action received for U.S. Appl. No. 14/843,810 dated Jul. 12, 2018, 33 pages.

Non-Final Office Action received for U.S. Appl. No. 14/843,810 dated Dec. 28, 2018, 30 pages.

Final Office Action received for U.S. Appl. No. 14/843,810 dated Apr. 30, 2019, 35 pages.

* cited by examiner

STYLING SYSTEM

CROSS-REFERENCE TO RELATED APPLICATION

The present application is a continuation of and claims priority to co-pending U.S. patent application Ser. No. 14/843,810 filed on Sep. 2, 2, 2015, entitled "STYLING SYSTEM," which claims priority to U.S. provisional patent application Ser. No. 62/046,142, filed Sep. 4, 2014. The entireties of the aforementioned applications are hereby incorporated by reference herein.

BACKGROUND

A user interface (UI) of a computer program, to be considered favorably by end users, needs to be appealing, straightforward to use and consistent in its operation. One of the ways to make a UI straightforward to use is by using various mechanisms to guide the user in knowing where he or she is operating with respect to the UI. A typical UI example is to highlight the currently focused UI element, so that the user knows that further interaction with that element (e.g., a click, tap, double-click, typing the "Enter" keyboard key and so on) will cause some action related to that particular element to be taken.

To be appealing and consistent, a designer of the UI wants to choose colors, font sizes, UI element positions and so forth that are attractive yet do not vary too much from one another for the most part. For example, consider a menu containing interactive elements. Once a user learns how to interact with that menu, e.g., the user quickly knows which item is in focus, knows how to move around within the menu to select items and so forth, then consistency may be achieved by making similar menus generally appear and operate in the same way.

At the same time, a designer may still want some different types of menus, (e.g., lists versus grids of selectable elements) and interactive elements, and to sometimes use techniques such as different color schemes to emphasize those differences. Having the same font color, font size, background color and so forth can make the design easier to implement, but is very limiting to designers who want to provide a UI that is appealing, straightforward to use and generally (but not entirely) consistent. Such a UI design is thus not straightforward to implement from the designer's perspective, given the many hundreds or even thousands of different UI elements that each have certain properties which taken together accomplish the designer's goal.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards styles, comprising property value sets that determine the rendering of a user interface element, referred to as a "view" object/instance or the like. A request for a view instance is received, the request associated with an identifier set (comprising one or more identifiers). An unstyled view object and a style are located based upon the identifier set, in which the style comprises a set of property values for the unstyled view object. By applying the set of property values to the unstyled view object, a styled view object comprising the view instance is constructed. The view instance is returned in response to the request. The style may be generated prior to using the style during runtime.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
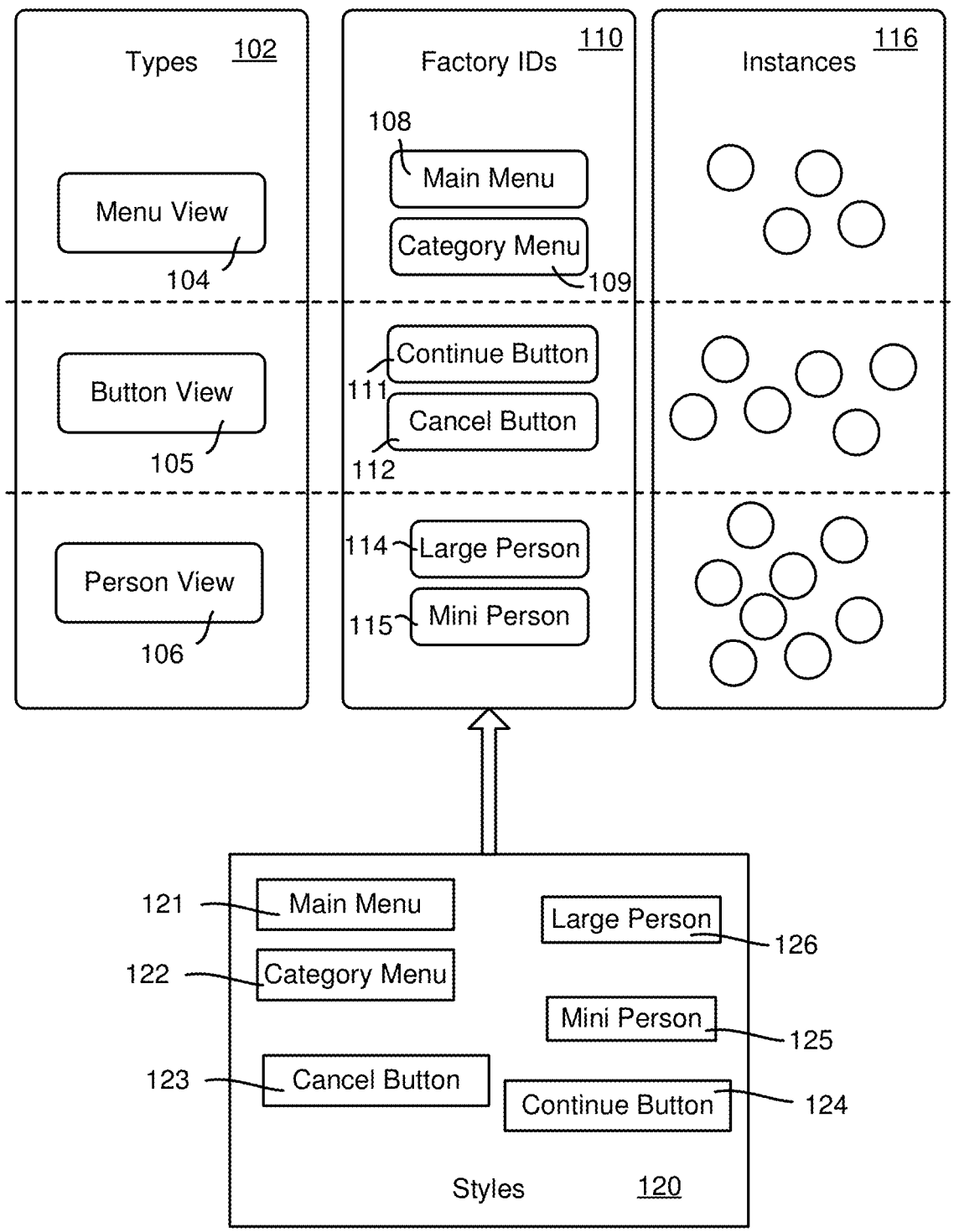
FIG. 1 is an example representation of types, views for those types and instances of the views, along with styles to apply to each view, according to one or more example implementations.

Various aspects of the technology described herein are generally directed towards a user interface (UI) technology that provides the ability to map a style to any given UI element, referred to herein as a "view" comprising an object or the like. In general, a style comprises a set of properties that when applied to a view determines the appearance of that view, such as the background color, font, font size, font color, position of child views therein, any effects such as shadows, borders, animations and so forth.

Each view can be styled with the properties a designer desires, however the designer need not specify every property for every view. Instead, the designer can specify a set of default style properties once, and then override any default style property for a given view by specifying a different style property value for that view. For example, by default a "menu" view may be styled to have a red background and contain blue buttons with white text of size 14 pt., in Times New Roman font. However, as chosen by the designer, for a given menu view such as a "Genre" selection menu, the designer can specify that the "Genre" selection menu background instead be black, by automatically inheriting the default property values and only overriding the background color property (along with any other properties as desired) that the designer wants to be different for the "Genre" menu.

Moreover, the designer can override overrides, and so on, to design whatever is desired for each view. For example, consider that the user selects "Comedy" from the "Genre" selection menu, in which event the user gets an interactive "Comedy" menu from which to select a movie or television show. If desired, the designer can specify that the "Comedy" menu inherit the default style property values, as overridden by the Genre" selection menu style property value(s), as further overridden by a "Comedy" menu style property value that changes the buttons' background color to green. Thus, in such an example, the "Comedy" menu has white text of size 14 pt., in Times New Roman font (as inherited from the default styles), a black background (as inherited from the Genre menu style) and contains green colored buttons (as overridden by the Comedy menu's style).

In general, the designer basically constructs a hierarchical tree of property values, each node of which may be mapped to a given view. For efficiency, in one or more implementations, styles are not (typically) allowed to change during the runtime, whereby at the start of runtime during loading (or even before runtime, such as during a compiling operation), such a tree is flattened into different static styles (sets of property values), with a view mapped to one of the styles.

It should be understood that any of the examples herein are non-limiting. For instance, different visual appearances of different views via styles are exemplified herein, however a style is not limited to appearance, but also includes concepts such as audio, vibration and so forth that may be applied to any view. Indeed, "rendering" a view includes applying style properties that determine the view's appearance as well as any audio, vibration, animation over multiple rendering frames and so forth. Notwithstanding, for purposes of illustration herein, the examples used are generally related to a given view's appearance as rendered in a single rendering frame.

Further, any of the logic and the like may be implemented in software, hardware or a combination thereof. Still further, an entertainment/game console is one example computing environment, however any other suitable computer-based device such as a personal computer, tablet device, mobile computer device and the like may implement the technology described herein.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and user interface concepts in general.

In one or more implementations, a UI is composed of various UI objects (referred to as views) with which the user can interact. Example views are menu views, comprising containers for button views and/or tile views with which the user may interact as well as other information (e.g., interactive text input boxes, non-interactive text, images and so forth). The appearance of the views is generally determined by the underlying data they are conveying, as well as how they visually present that data. For example, a "Menu" view typically contains a list or grid of interactive buttons or tiles, and may have certain properties. The meaning of each button may be determined by a UI developer (or even by data underlying that button, which may vary), and the styles of the Menu view and its buttons when rendered determine its appearance to a user (and, as set forth above, possibly other user-sensed information such as audio, vibration, button repeat behavior and the like).

FIG. 1 is a representation of how a number of UI element types, referred to as views, may be used to provide a user interface. In the example of FIG. 1, there are different types 102 of views, including a menu view 104, button view 105 and person view 106. As can be readily appreciated, this is only a simplified example, and a complex UI design may have many more view types, and hundreds or possibly thousands of different views (e.g., type and subtypes) among those view types. An example of a type and subtype may be a type "Category" with a subtype "Action" and the same type "Category" with a different subtype "Comedy" as described herein. These may correspond to menus, for example, and they may have different styles from each other if desired by the designer.

To this end, each view type is associated with one or more identifiers (an identifier set) that distinguishes that view type from other view types, as well as allows for subcategories of a view type, each subcategory allowing for association with even more specific information. In the example of FIG. 1, there are two different types of Menu views exemplified, namely a "Main Menu" view 108 and a "Category Menu" view 109, with each menu type identified by a factory identifier (ID) of a defined set of factory identifiers 110. Similarly there are two button types 111 and 112, each with a factory ID, and two person view types 114 and 115, each with a factory ID. Note that in general, "a factory ID" corresponds to an object creation factory, which is an object that returns another object instance, e.g., a view factory returns the view object as requested using the factory ID and any other parameter(s) associated with the request. Note however that a factory pattern is only one way to implement a styling system as described herein, and any constructor entity that can create a styled object from an unstyled object and style property data based on a specified identifier set may be used. In any event, there may be multiple instances of any view, as represented in FIG. 1 via the circles in block 116.

A designer may thus specify a different style for each view, as represented by the sets of styles 120, labeled as individual styles 121-126 in FIG. 1. As will be understood, given a factory ID, a view factory (or other suitable mechanism) maps the factory ID to a view and to its style, and applies the style to the view to return a stylized view object instance. Note that one or more other factories also may use styles, e.g., a view host factory may create a view host object that hosts a view; if the view host object is rendered, the view host object may have style property values applied to it by the view host factory.

Beyond the example of FIG. 1, in a given UI and system/platform, there may be other view types, as well as subcategories of each view type (when further specified by another identifying parameter). With respect to subcategories, as set forth in the above examples, a Menu view may have a "Genre" (or "Category") factory ID and an "Action" object ID, while another Menu view has the same "Genre" factory ID with a "Comedy" object ID. The view factory uses both IDs as an identifier set to return such a view with its associated style. In this way, as generally represented in FIGS. 2A and 2B, two (or more) different Genre Menu views can share some characteristics yet have some individual styling characteristics (corresponding to each subcategory) as desired by a developer.

Figure 2A:
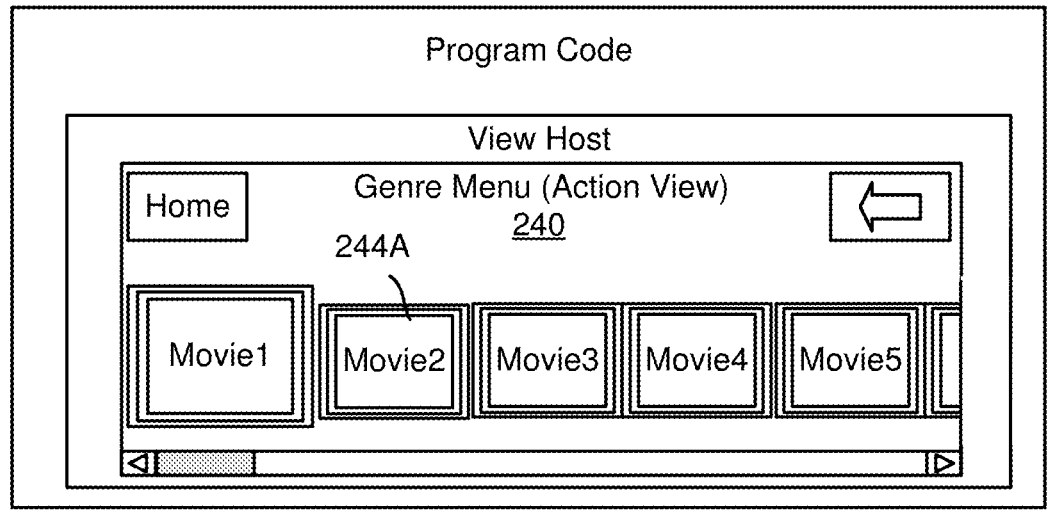
FIGS. 2A and 2B are example representations of a user interface comprising various views, in which a view's style determines how children views appear, according to one or more example implementations.
Figure 2B:
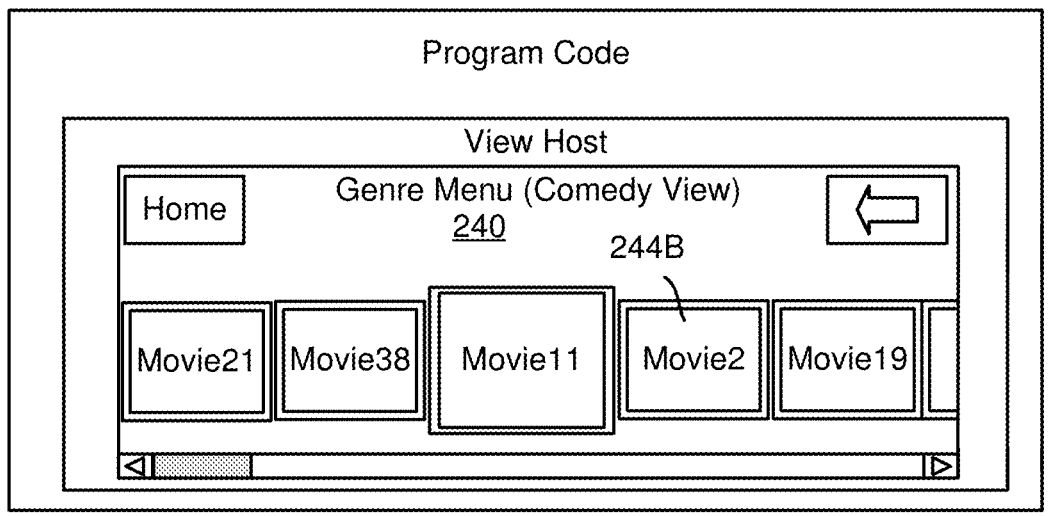

For example, the Genre/Action menu 240 of FIG. 2A may have its movie selection tiles surrounded by a triple border (or for example some different menu background color, tile location in the menu and so on), while the Genre/Comedy menu 242 of FIG. 2B may have movie selection tiles surrounded by a double border (or for example some different menu background color, tile location in the menu and so on). As a result, a tile view representing the same movie (one that is classified as both Action and Comedy), such as "Movie 2" (represented by tile 244A in FIG. 2A and tile 244B in FIG. 2B) may have be rendered so as to appear differently in the two different view menus 240 and 242, even though the "Movie 2" tiles 244A and 244B themselves may be identical copies of the same tile view instance (thus having the identical styles). Such different styling accomplished in a straightforward yet efficient manner by the styling system as described herein.

Thus, one of the characteristics of a view type as further identified by its identifier set/creation parameters (e.g., factory ID and possibly an object ID and/or possibly one or more other construction parameters) is the appearance of the view. As described herein, each view is associated with a style, comprising a set of property values that are used to determine the appearance and any other rendering properties of that view. As one simple example, the "Main Menu" factory ID may be associated with a blue background for the "Main Menu" View whereas the "Category Menu" factory ID may be associated with a yellow background for the "Category Menu" View.

In designing a styling system, a number of considerations are relevant, including providing a mechanism that targets to which view or views a style applies. As will be understood, in one or more implementations described herein, the identifier set of one or more identifiers (e.g., the Factory ID, possibly with an object ID and so on), associates a view with its style. In general, however, any identification system that maps a view to a style may be used by a constructor entity that provides the view instance. A request for a view includes the identifier set for that view, and the identifier set maps that view to its style.

There may be a one-to-one mapping between a view and a style, as well as a many-to-one mapping, e.g., two or more different views can each be mapped to the same style. Typically there is not a one-to-many mapping, however it is feasible to implement such a system, e.g., a view can have a daytime style and a nighttime style, one of which is selected (mapped) by the constructor entity (e.g., view factory) based on the ambient light, or time of day, and so on.

Another consideration is how to express the values of various styleable properties. JavaScript® is one such way that the various property values may be specified, and is used in the examples below. However, any suitable programming language may be used for this purpose, including one(s) that use visual programming tools.

Yet another consideration is composing styles. It is generally inconvenient and inefficient for a developer to repeat each of the properties for each of the (e.g., hundreds or even thousands) of UI elements of a user interface. Instead, as described herein, a developer can specify each property value once, which thereafter applies to any view by default unless overridden, with customization to override any default value(s) being straightforward to implement as desired. Composing styles is described herein in additional detail.

Still further, the performance of the system is yet another consideration. As will be understood, this may be accomplished in part by intentionally limiting the set of styles to a fixed (static) set. For example, with fixed styles, the views as arranged in a view tree need not be recomputed each time a user performs an action such as to change focus to a different UI element. This is highly performant relative to systems that re-compute the view tree frequently.

Figure 3A:
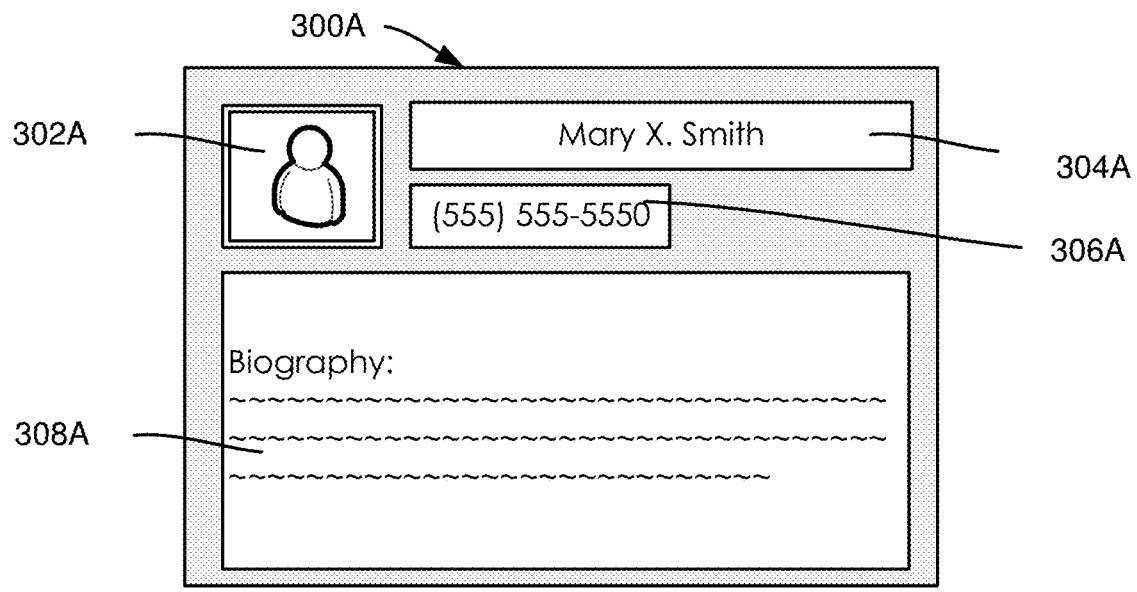
FIGS. 3A, 3B, 4A and 4B are example representations of "Person" views, each with different styling that determines how a view and its data may be rendered, according to one or more example implementations.
Figure 3B:
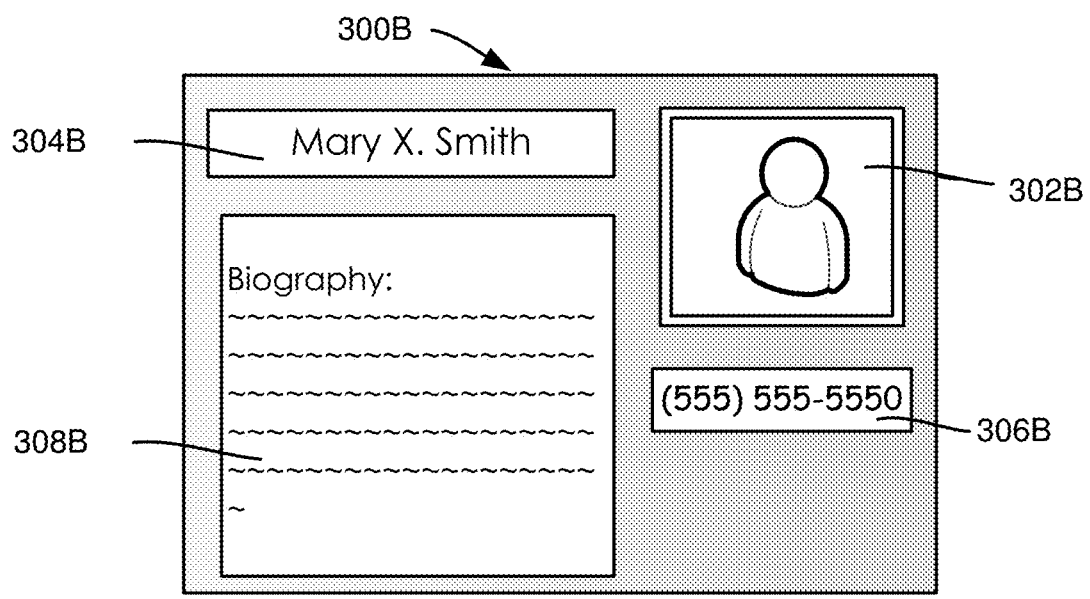

Turning to the various aspects of styles, and by way of example, an application may have View that is bound to data about a "Person". The data associated with a person may be as shown in FIGS. 3A and 3B, in views 300A and 300B. In FIG. 3A, the rectangular region 302A represents a region for showing profile picture data, the rectangular region 304A represents a region for showing name data, the rectangular region 306A represents a region for showing phone number data and the rectangular region 308A represents a region for showing biographical data. In FIG. 3B, the profile picture data region is labeled 302B, the name data region 304B, the phone number data region 306B and the biographical data region 308B, respectively.

There are thus different ways in which a "Person" view may visualize this Person data, (including some additional ways not shown in the drawings, such as color data and/or animation). Consider that in FIG. 3A, for example:
  a. The entire View 300A is rendered with a border, and a flat shaded background.
  b. The profile picture region 302A is rendered as a certain sized (e.g., 96×96 pixels) icon in the top left, with a double border.
  c. The name region 304A is to the right of the picture region 302A.
  d. The phone number region 306A is below the name region 304A.
  e. The biographical data in region 308A is below everything else.
  f. The text is in Century Gothic font, 12 pt.

In the alternative Person View of FIG. 3B, for example, in which the layout differs from FIG. 3A as exemplified in the drawings:
  a. The Name text in region 304B is in 14 point font size
  c. The phone number in region 306B is in the Comic Sans font.
  d. The Profile picture in region 302B is bigger (relative to FIG. 3A), with a white (e.g., 4 pixel) border.
  e. The View 300B has a gradient background with a drop shadow.

Figure 4A:
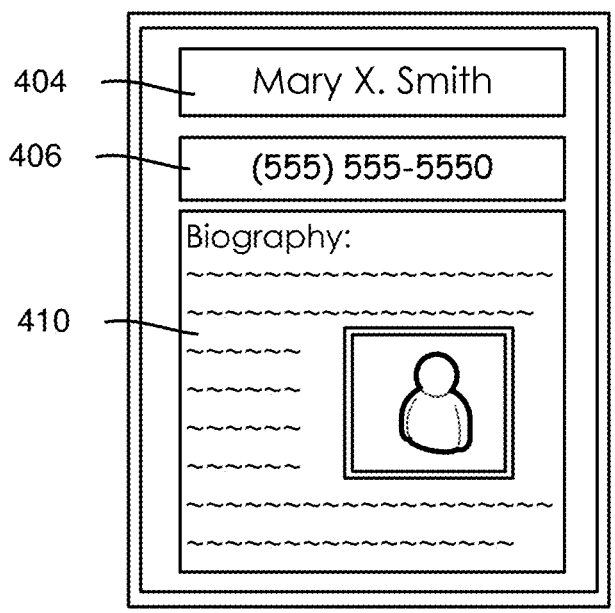
Figure 4B:
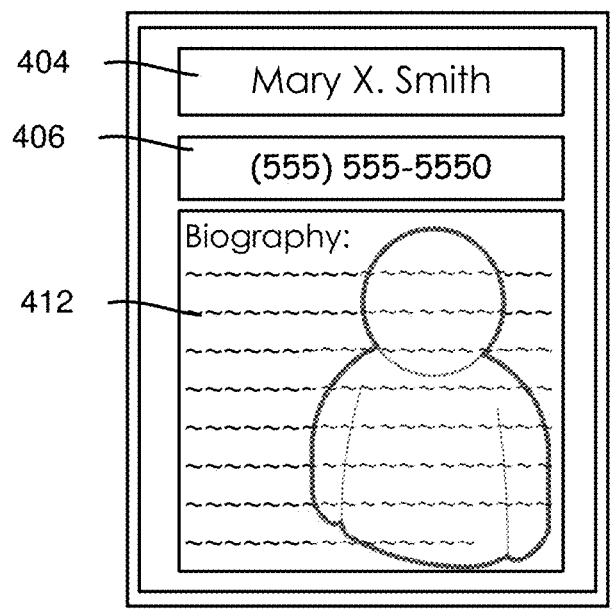

Yet other ways to view the Person data are shown in FIGS. 4A and 4B. In the example of FIG. 4A, the rectangular region 404 represents a region for showing name data and the rectangular region 406 represents a region for showing phone number data. In this other style, the region 410 is for showing biographical data along with the profile picture data, e.g., shown with text flowing around the picture data.

In FIG. 4B, the name and phone number regions 404 and 406 respectively are styled the same. However, in the region 412, the biographical data and picture are different, e.g., the picture is semi-transparent and overlaying the text. The differences/variations in how the Person data is visualized may be considered to be each view's style. As seen in FIGS. 3A-4B, the style configures various aspects of the visualization such as layout and sizing of sub-elements, font family, size, color, etc., borders, shadows, backgrounds and other adornments.

Thus, as can be seen, the person data is visualized in a Person view object instance containing a name view instance, a telephone number view instance, a biography view instance and an image view instance. How the visualization is rendered to appear to the user is determined by the style data of each view instance, as exemplified in FIGS. 3A-4B. Note that as is understood, such a Person view object instance may be contained in a higher-level parent container view instance, which, for example, may include other views such as a "Previous" button view, a "Cancel" button view and a "Next" button view by which a user may navigate among different person views.

As described herein, views may be (and typically are) composed into a tree structure, and some aspects of a style lend themselves to being inherited. For example, if a designer wanted to use the Gotham Font family everywhere on a page or even in the entire UI, it is inconvenient to have to specify this for all of the many views in the application. To assist the designer, styles as described herein are composable.

At the same time, there is a balancing between flexibility and performance. View trees are highly dynamic, so there needs to be some consideration of not ending up with a system where computing the styles becomes a performance bottleneck. As described herein, an example UI (one directed towards media applications that may show streaming video) is based upon a styling system that delivers a high degree of flexibility, composability and performance.

In one or more implementations, views are types that define properties that can be styled. The styling is not applied to the type, but is rather applied to a view as identified by an identifier set, e.g., including a factory ID (or factoryId), as generally described above with reference to FIG. 1. The factoryId is an identifier that can be used to stamp out an instance of a type with a particular style applied, (although as will be understood, more than one identifier can be used to specify even more particularly styled instances of a type).

Returning to FIG. 1, there is a many-to-one relationship which is represented by the separation via the dashed lines. In the example of FIG. 1, there is a type called MenuView 104 which includes some stylable properties. As a further example, this type may be used in two places in an application program, e.g., MainMenu 108 and CategoryMenu 109. These two places each get a factoryId, and are thus able to be independently styled, using the style that maps to that factoryID from among the set of styles 120. While the user is interacting with the application he or she may navigate to and from the MainMenu screen multiple times, each time creating (instantiating) a new instance of a MenuView 108 with the MainMenu style 121 applied (although it is sometimes possible to cache an instance for reuse rather than always create a new instance).

Thus, a style is targeted at a factoryId, corresponding to a place in the application where a view type is used. Styles may be considered as a way of specifying how to prefabricate a view when creating an instance. In other words, the view determines the set of properties in use, and the style determines the values of those properties.

Figure 5:
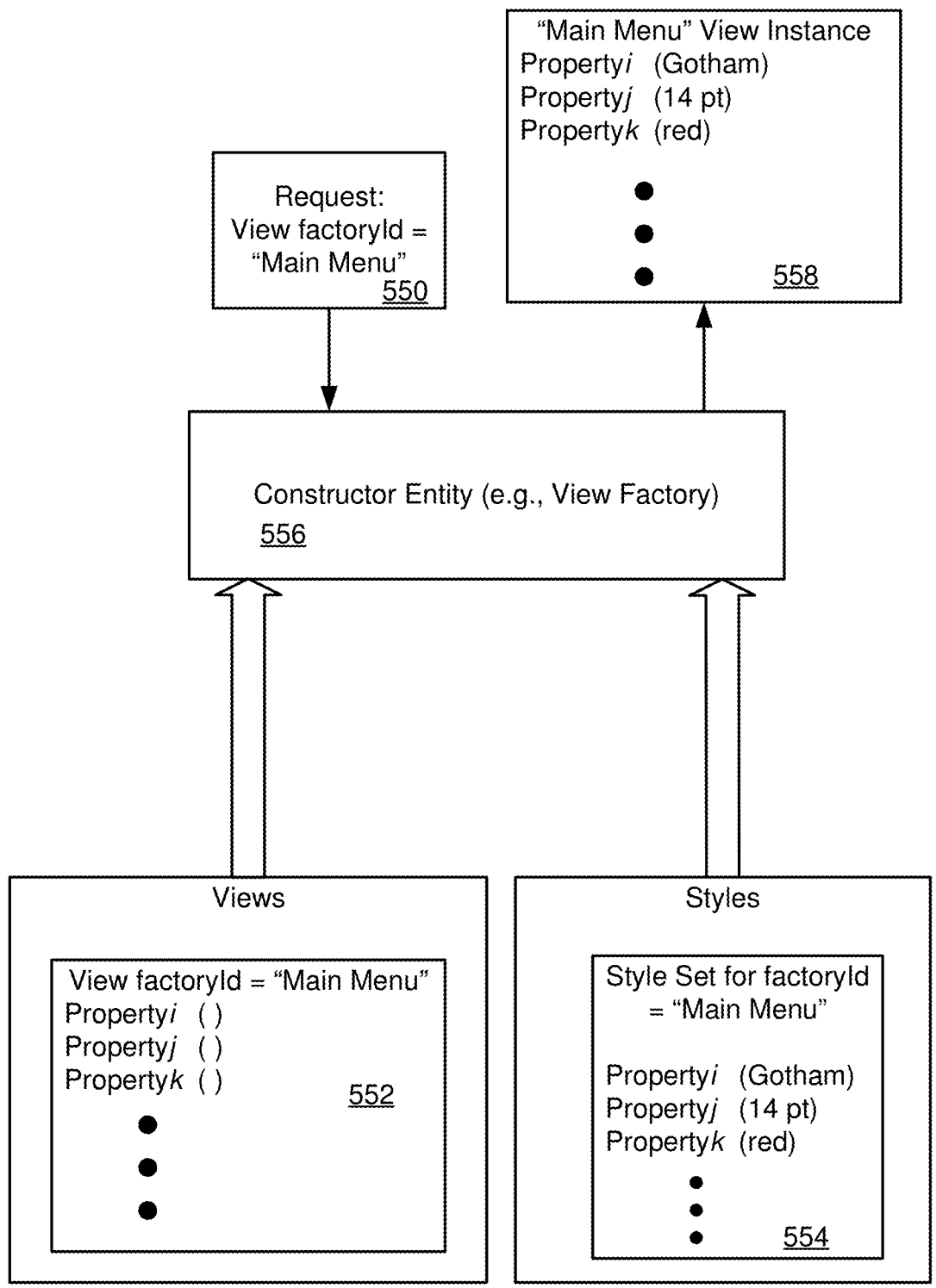
FIG. 5 is an example representation of how an identifier set may be used to locate an unstyled view and its style to construct and return a styled view instance, according to one or more example implementations.

In one or more implementations, views support what is referred to as an init-constructor. An init-constructor is a constructor method that takes initialization property bags as an argument. The keys in the property bags correspond to properties of the view and the values are applied to the view's properties at construction time. Thus, styles apply values to a set of properties. When as in FIG. 5 a view is requested (block 550), the unstyled ("blank") view 552 and the style 554 for that view are combined, whereby the system constructor entity (e.g., a view factory 556) outputs a concrete instance 558 of the view.

Note that the program code need not (and typically would not) specifically request a style. Instead the code simply specifies a factory ID (e.g., "main menu") for the desired view whereby one or more factories (e.g., a location factory, view host factory, view factory and so on as needed) operate together to return the requested view with the associated style properties. In other words, in this example, the style is coupled to the requested view by the specified factory ID. Notwithstanding, it is alternatively feasible for program code to request a view with a different style; e.g., basically program code could make a request such as "return the MainMenu view with the SettingsMenu style." This is one possible alternative that specifies different factory IDs for the view and the style. In this alternative example, the identifier set includes two factory IDs, and possibly other identifier (e.g., object ID) data.

In one or more implementations, the individual styles are expressed via a series of JavaScript® modules, which are combined to form the set of styles available to the application. The specific modules that are included can vary between different incarnations of that application to achieve different styles on different platforms. For example one designer may want to style grids to be horizontal on a gaming console platform, but be vertical on a mobile device platform using this mechanism.

To express the values of various styleable properties, a Style is a property bag that is associated with a FactoryId. In JavaScript® this can be expressed via an inline object:

var defaultStyle={font: "Gotham", fontSize: 14,
        background: "red"};

With respect to how styles can be composed, for styles it is desirable to avoid having to repeatedly specify the default font and default background styling, for example. Instead, the developer need only specify when something deviates from this default. This is done by composing styles:

var buttonStyle=style({fontSize: 20}, defaultStyle);

In this example, 'style' is a style composition operator that takes a new style and an existing style and produces a composed style. In the composed style, the new style is merged with the existing style and overrides any properties they share in common. Thus, in this example any button associated with the "buttonStyle" has a font size of 20 instead of the default size of 14, yet otherwise has the default style property values.

Figure 6:
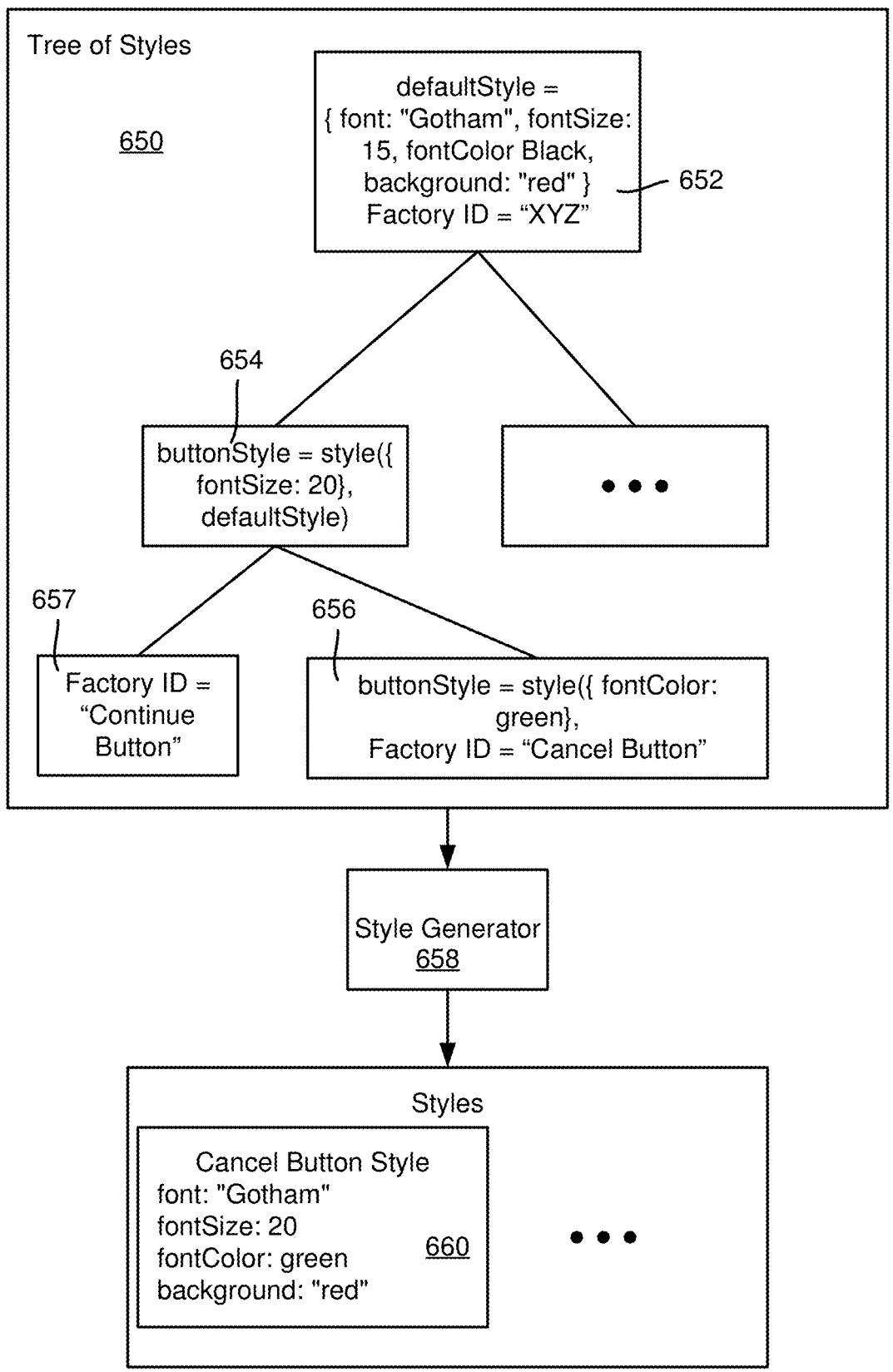
FIG. 6 is a representation of an example tree structure showing how styles may inherit and override property values, according to one or more example implementations.

Conceptually, as represented in FIG. 6, this forms a tree of styles 650 in which each of the leaf nodes is associated with a factoryId. Note that some of the branch style nodes may be strictly for composition purposes and not associated with a factoryId, (although some non-leaf nodes also may have a factory ID, e.g., in the event that there is a need for a style A that is more specific than the default style and a need for an even more specific style B, relative to style A). For example, in FIG. 6, to apply the default style to a button, the factoryID "XYZ" corresponding to the node 652 may be used; however the "Cancel Button" factory ID has a more specific font size (20) override style for buttons via style node 654, and further, an even more specific override style for the font color (green) via node 656.

In general, this tree is flattened into static computed styles at style loading or compiling time (rather than dynamically traversing the tree during runtime), which is possible because styles are not dynamic in one or more implementations. A style generator may process the style composition operators in the program code to directly produce the static styles during loading or compiling.

Alternatively, the program code may be processed such that the style data is arranged in an actual tree of nodes, which is then flattened. As another alternative, a visual programming tool may allow a designer to build the tree of styles directly (or indirectly, but still visualized), with the tree then flattened, such as described herein.

With respect to a tree of nodes, as described herein, a style generator 658 may compose each style defined in the tree, e.g., by processing the tree and merging styles, including overriding any shared properties with any more specific property values lower in the tree. Thus, in the example of FIG. 6, it can be seen that for the "Cancel Button" factory ID, the default style (node 652) is merged with a branch button style (node 654, which overrides the default font size from 15 to 20), which in turn is merged with the "Cancel Button" leaf node 656 (which overrides the default font color from black to green). The "Gotham" font and red background are unchanged from the default style. These properties are maintained in association with the "Cancel Button" style 660 for access by the view factory as needed. It is understood that the style property values for the "Continue Button" are the same as the "Cancel Button" properties except that the font color for the "Continue Button" remains black (as inherited from the default style).

Figure 7:
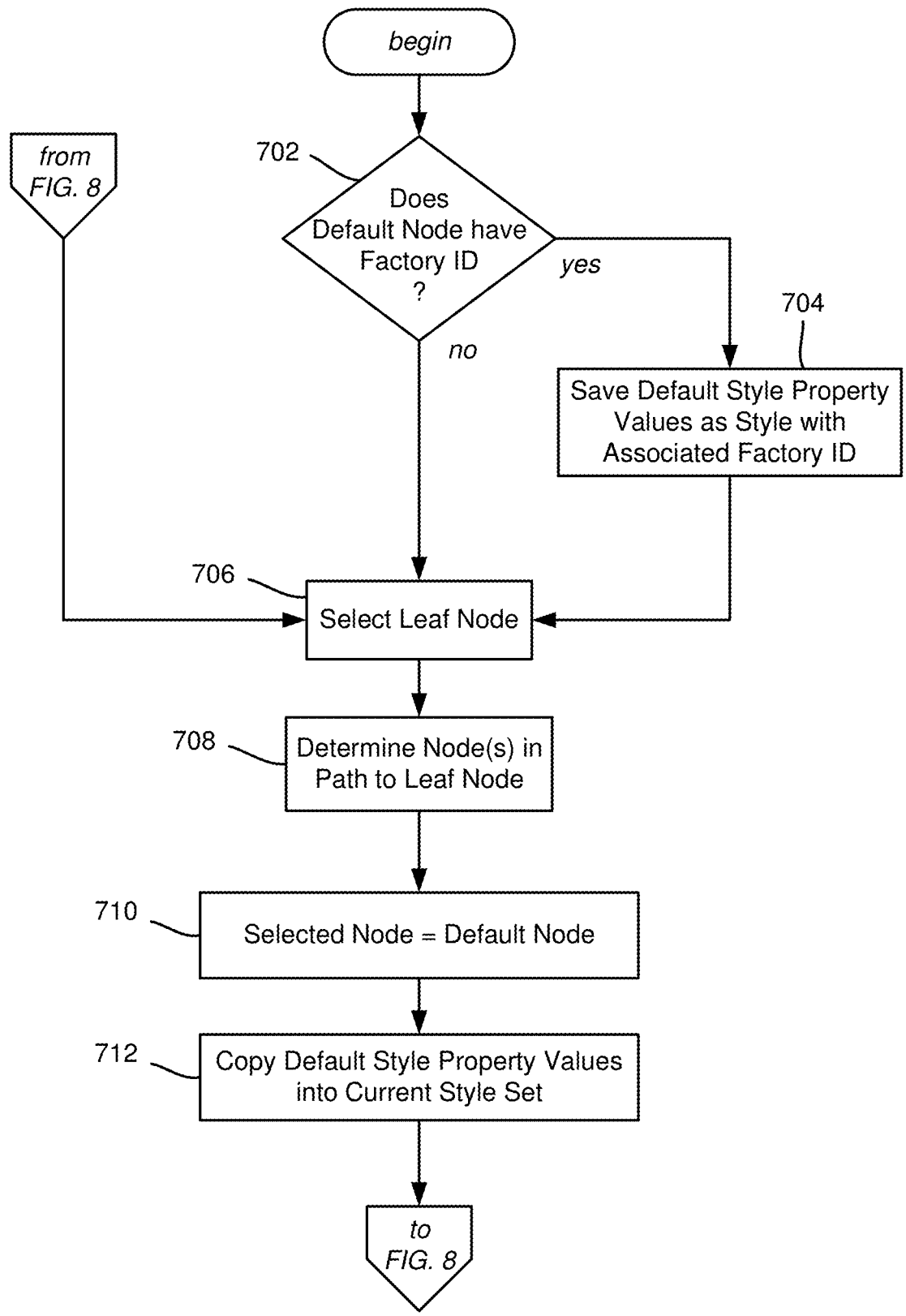
FIGS. 7 and 8 comprise a flow diagram showing example steps that may be used to flatten a tree of styles into a static set of styles for use in styling views during a subsequent runtime session, according to one or more example implementations.
Figure 8:
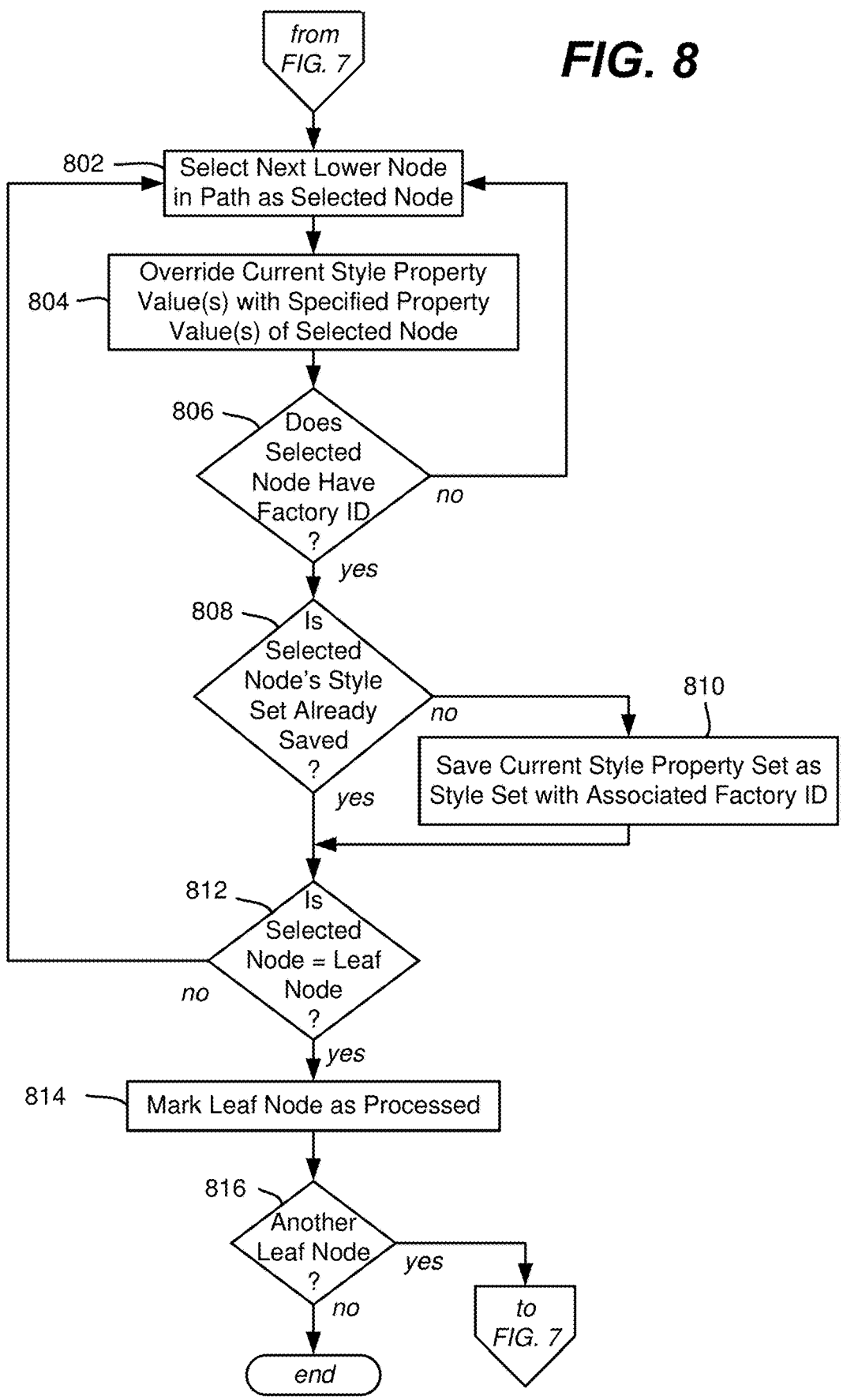

With respect to example style generation, FIGS. 7 and 8 show how such a tree may be processed into a set of styles, each style maintained in association with a factory ID; (while a factory ID is exemplified, a set of more than one identifier such as a factory ID plus object ID can be inferred from the steps of FIGS. 7 and 8). In general, a style is built and maintained for each factory ID.

Figure 9:
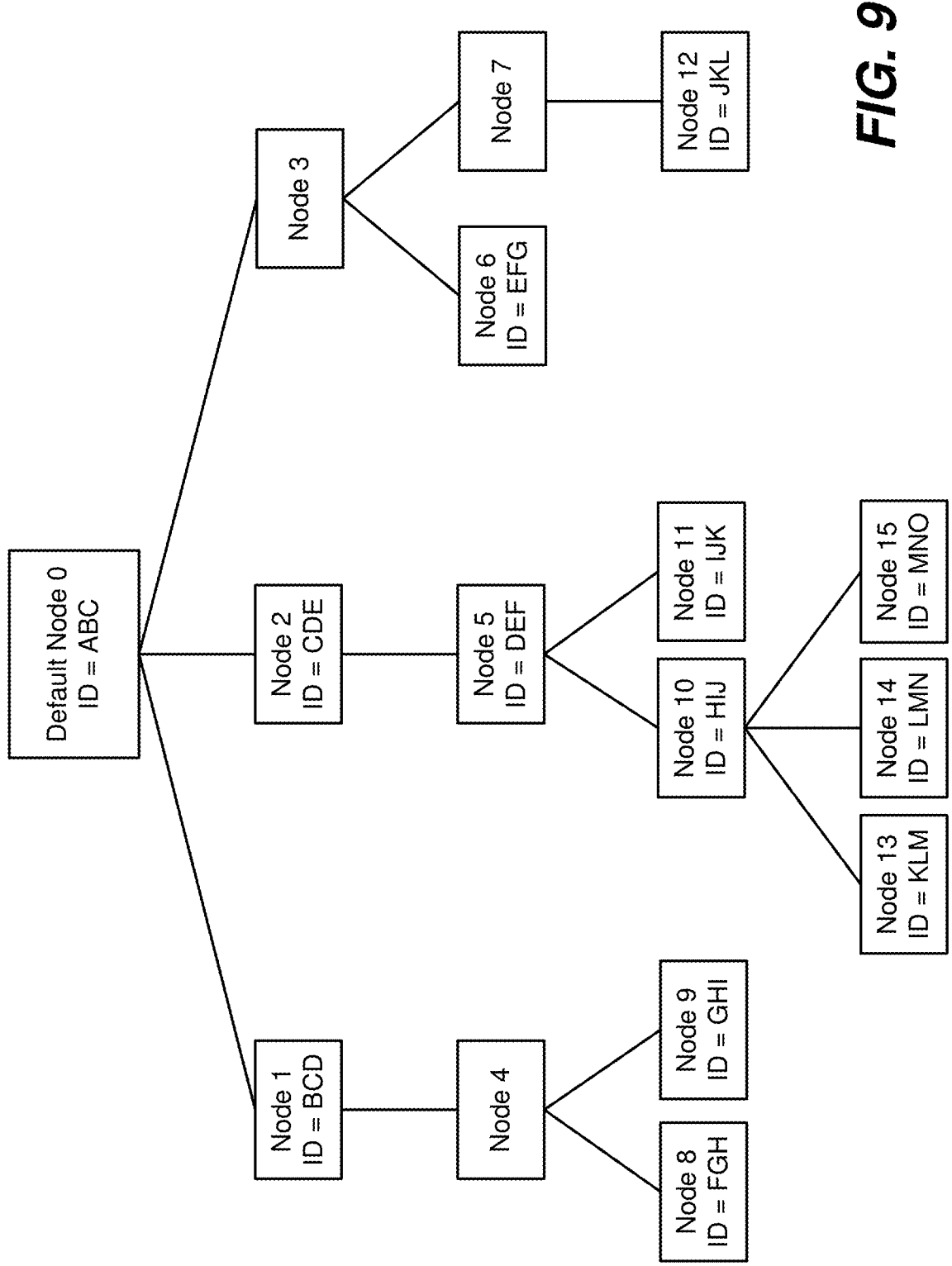
FIG. 9 is a representation of an example tree structure used in the examples of FIGS. 7 and 8 showing how the tree may be traversed via different paths to leaf nodes, according to one or more example implementations.

For purposes of this example explanation, consider that the tree of FIG. 9 is being processed. For purposes of brevity, also consider that although not explicitly shown, the default node contains a value for each style property to be used in the UI, and each lower node has at least one override property value. In FIG. 9, a leaf node has a factory ID, whereas a non-leaf node may or may not have a factory Id. Although not shown in FIG. 9, to map different views to the same style, a single node may, for example, have multiple factory IDs. A style's property values that are the same for two or more different views need not be saved more than once, as a factory that applies a style may map different factory IDs to the same style property set in such a situation.

Note that depending on the rules for constructing a tree, it is feasible that a given node (as in the node 657 of FIG. 6) may only specify a factory ID rather than also include property value(s) override; (the tree data is the same as processed in this example if the node 657 is merged into the node 654 during tree construction, or even afterwards). In the example flow diagram of FIGS. 7 and 8, such a condition is not allowed, (e.g., because doing so needs extra logic to avoid saving a style more than once, each with a different factory ID; any such logic needs to handle a situation in which a factory ID is specified but the style has not yet been saved, as well as the situation in which a factory ID exists but the style has already been saved in association with a different factory ID). Pre-processing of a tree to merge "factory ID-only" nodes up to a higher node that has at least one override property value (or up to the default node if need be) can be performed to avoid such a situation.

As can be seen, in FIG. 9 each node is labeled (numbered), and the paths (branches to each leaf node) may be determined as the tree is built or afterwards. Thus, for example, the path to node 8 is {node 0, node 1, node 4, node 8}, the path to node 9 is {node 0, node 1, node 4, node 9}, the path to node 13 is {node 0, node 2, node 5, node 10, node 13} and so on; (node 0 is in every path, and thus is omitted hereinafter). Further, in FIG. 9 any node that is associated with a factory ID (and thus a view) is labeled as such, while the nodes that are only for composition purposes are those not associated with a factory ID.

Step 702 begins the process, which first evaluates whether the default node is associated with a factory ID. If so, step 704 saves the default style property values as a style with the associated factory ID, (or if appropriate, with multiple factory IDs); if not associated with at least one factory ID, then no view uses the default style without at least one override property value so this style need not be saved as is.

In the example of FIG. 9, the default node has a factory ID of "ABC" and thus a style (the default property value set) is saved for this factory ID. As will be understood, saving the default values with a factory ID may be handled otherwise in the example flow diagram, however because the default node is in each path, performing step 702 (and if appropriate step 704) one time, e.g., before (or after) processing the various paths, results in being able to avoid redundant evaluation steps for the default node in each path being processed.

At step 706, a leaf node is selected, such as the leaf node 8 of FIG. 9. Note that each leaf node has at least one factory ID (the tree may be evaluated for this state and considered incorrect if not). Step 708 determines the path to the leaf node, or obtains the path if the path was saved beforehand. As set forth above, after node 0, the remaining path in FIG. 9 for node 8 is {node 1, node 4, node 8}.

Step 710 selects the default node, node 0, as the selected node. Step 712 copies the default property value set into the current working set. Note that for different leaf nodes, the process loops back as described below, and thus if the currently selected leaf node is not the first leaf node being processed, step 712 overwrites any other values that may be in the current working set from a previous leaf node's processing so that each new leaf node is initialized with the default style property values. The process continues to FIG. 8.

Step 802 of FIG. 8 selects the next lower node in the path, e.g., node 1 in the example of FIG. 9 for the leaf node 8. Step 804 overrides any property value or values of any higher node, which at this time are the default property values.

Step 806 determines whether the selected node has a factory ID, meaning that the selected node represents a style for a view. If so, step 808 evaluates whether the style for that node has already been saved (e.g., via previous branch processing), and if not, step 810 saves the current (working) style property set as a style set with the node's associated factory ID, e.g., factory ID "BCD" for node 1 of FIG. 9.

Step 812 evaluates whether the selected node is also the selected leaf node. If not, as in the current example in which currently selected node 1 is not a leaf node (but instead is in the path to the selected leaf node 8), step 812 returns to step 802 which selects the next lower node, node 4 in the example of FIG. 9.

Step 804 again overrides any property value or values in the current property value set, which thus becomes the default property values as overridden by the property value(s) of node 1 as further overridden by the property value(s) of node 4. This time, however, node 4 does not have an associated factory ID, and thus step 806 returns directly to step 802 to select the next lowest node in the path, leaf node 8.

Step 804 again overrides any property value or values in the current property value set with any values specified in leaf node 8. In this example, step 806 detects that node 8 has a factory ID (of "FGH"), step 808 detects that this factory ID does not have a saved style, and thus step 810 saves the style in association with the factory ID.

This time, the selected node is the leaf node 8, whereby step 812 instead branches to step 814 to "mark" the leaf node as having been processed. As can be readily appreciated, this "mark" operation may be accomplished in any number of ways, e.g., to move a pointer down in a list or other data structure of paths to leaf nodes, to flag a leaf node (or path) as processed within a list or other data structure, to remove the leaf node or path from a list other data structure, and so on.

Step 816 repeats the process from step 706 for the next leaf node, e.g., the leaf node labeled 9 in FIG. 9. As can be understood, the steps are mostly similar for the leaf node 9, overriding the default values with those specified in the nodes on the rest of the path {node 1, node 4, node 9}. An exception is that for this path, for node 1, there is no need to save the current style property set/factory ID "BCD" at step 810, because (as detected via step 808) this style was already saved during the previous processing of the path to node 8.

As can be seen, when the tree is flattened, the various styles are each saved as fixed data objects/property value data sets or the like and associated with a factory ID (or IDs). They then may be used by a constructor entity as needed to create an instance of a view. The overriding of default styles with more specific style property values provides significant flexibility to a designer while eliminating the need for specifying each property value for each view.

Notwithstanding the overriding of more general style data with more specific style data, it is straightforward to implement a system in which a higher style can block a lower style's override, for example. Although not explicitly shown in FIGS. 7 and 8, a specified style may include a flag or the like that if set is detected by the style generator 658 (FIG. 6) to block overriding from below/force property value inheritance from above. For example, a lead designer may want to have a particular font used throughout a user interface that is not to be changed by an unaware assistant designer, or even inadvertently changed by the lead designer herself. Such a flag or the like may be used for the default font in this example. It is feasible to use such an override blocking flag at any node in the tree and have it apply to any node(s) under that node, and it is also feasible to have a system in which such a flag may be turned on in a node and later turned off in a lower node/branch.

Figure 10:
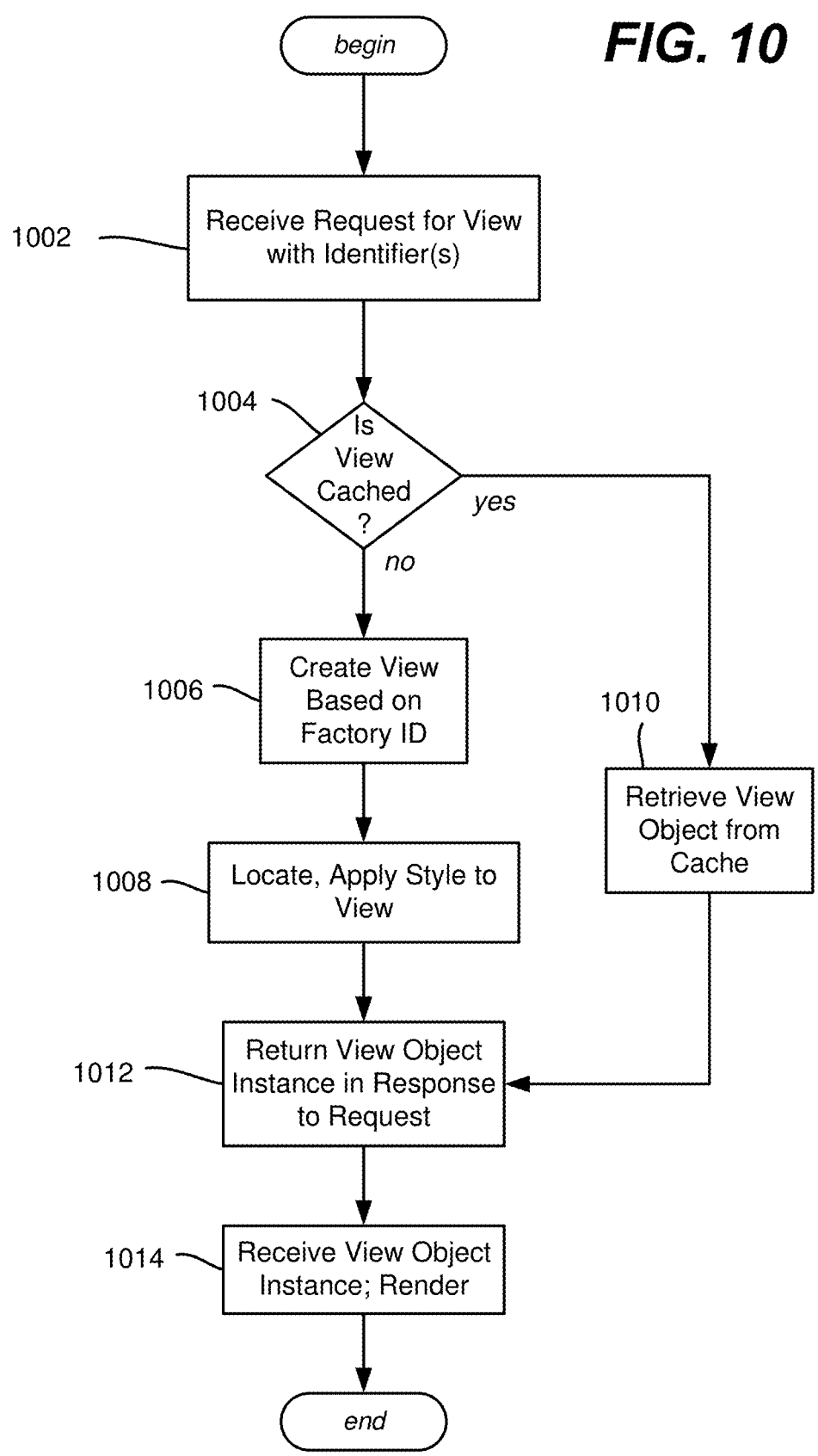
FIG. 10 is a flow diagram showing example steps that may be used to return a styled view instance based upon an identifier set, according to one or more example implementations.

FIG. 10 is a flow diagram from the perspective of a constructor entity (e.g., an object factory) responsible for returning a styled view, beginning at step 1002 where a request for the view is received, along with one or more identifiers for the view, e.g., a factory ID and possibly an object ID. Step 1004 represents determining whether the view has been previously created and is currently cached (which includes not being expired in the cache). If so, step 1004 branches to step 1010 to select a copy of the styled view instance from the cache, which is returned at step 1012; step 1014 represents receiving and the view object instance copy, which then renders itself, for example.

If not cached, step 1006 creates/instantiates the unstyled view object, which is styled via step 1010, e.g., the unstyled view object and style are located for this identifier set, with the style property values used to fill in the view object's style properties to create a styled view object instance. Step 1012 returns the styled view object instance; step 1014 represents receiving the styled view object instance, which then renders itself, for example.

With respect to the performance implications of the system, in one or more implementations, the UI framework is not used as a general purpose framework but rather is designed to make rich-media applications (such as HBO GOO). Therefore, in such implementations, an emphasis may be put on performance by putting constraints on flexibility, as it only needs to be as flexible as needed by a narrower domain according to a designer's design.

Styling in such a platform achieves desired performance through various constraints, including that styles are not based on a tree structure at runtime, rather they are based on an identifier set including a factoryId or the like. As the view tree changes, which may be in a highly dynamic fashion, there is not a need to re-compute styles. Because the targeting of styles is based on a factoryId, it is an O(1) operation to select the appropriate style for a view; (in contrast, with Cascading Style Sheets, or CSS, every modification to the Domain Object Model, or DOM, require extensive processing to re-compute styles. This is because CSS styles can target elements in a number of convenient, yet slow, ways. For example one can apply CSS styles to descendents of particular elements, or the odd children of a class of elements, or any number of powerful, yet slow, operators.)

In general, because there are possibly many thousands of views, many of which may never be used during a runtime session, it makes sense to style views on demand, rather than, for example, in a pre-styling operation (such as when the tree is flattened, or in a background operation). However, a designer may, for example, flag certain views for pre-styling, such as the main menu that is certain to be used, and other select menu(s), which may be based upon heuristics or statistics. For example, consider that some user X virtually always selects the "popular" menu after the main menu, so styling (and initially populating) the popular menu in the background may be worthwhile. Other views may be styled in anticipation of their need, e.g., as a user is scrolling through a subset of tiles that appear in a menu, the next subset may be virtualized, including pre-retrieving data for the view and applying the styles, before the tile view is actually in the visible space.

Once created, a view need not be restyled unless a different instance (rather than a copy of the same instance) is needed, or because memory space is such that an existing view is discarded. Through the use of caching (or possibly other object reuse techniques such as container recycling), a view that is read-only may be a copy of a cached instance of that view, or part of that view, in which event the style may be already applied.

In one or more implementations, the style on a view thus is static; once the developer constructs a view, that view's single effective style is fixed. This does not mean that a given style is not itself dynamic. Styles are able to specify transitions, such that, for example, a font may be one size when focused and another size when not focused. Such styleable transitions also allow for animations, e.g., a UI element may animate to move into a menu when the user first enters that menu (using entering style properties that change the element's position over multiple rendering frames), and then animate to move out of the menu (using similar exiting style properties) when the user takes an action that causes the element to exit that menu.

To this end, a view maintains states, including an "entering" state when moving into (and once moved into) a visible region, and an "exiting" state when moving out of the visible region. A style may specify different data for use in each state, including style animation data; for example, in the entering state, a view may fade into a visible region by transitioning (over a number of rendering frames) its opacity value to become less transparent until fully solid, and later fade out of a visible region in the exiting state by reversing this opacity transition. The view's style properties may include values for the entering state, including for the animation data (e.g., the starting and ending opacity values and the number of rendering frames or other corresponding time value), as may style properties for the exiting state.

A view also may maintain style-related data (e.g., based upon a set of Boolean flags) comprising additional information regarding the current interactive state of the view. For example, flag values may indicate when a view is 1) focused within its input scope, 2) hovered over (the view has pointer input over it), 3) listening (the view is listening for command input such as voice input and/or possibly gesture input), 4) selected (the view is active/invoked/toggled on), and/or 5) pressed (the view has either a pointer captured, or has the invoke button pressed). Each of these view states may have a style property value subset associated therewith, e.g., so that as in the above example, a view's font may be one size when focused and another size when not focused, and so on. Thus, even though a style on a view is static in that the property values to be used for an associated view are fixed, the style property set is dynamic with respect to which subset of the property values may be applied to the view at any time, based upon a current state within the variable states of a view.

With respect to each view, a mapped style is applied to that view. Thus, a parent view may have one style, and its child view or views may have a different style (and even may have different styles among multiple children of the same parent). It should be noted, however, that in one or more implementations, during runtime a parent view may override its children's styles, at least to an extent. For example, a parent view can specify a set of transitions to apply on its children (comprising child style overrides that override any child's styled transitions, regardless of what styled transitions if any are specified for a child. Note that if not parentally overridden, any child's styled transitions that exist are used.) This allows a container view to control how its children enter and exit via animation, for example. A runtime mechanism in each parent view allows such a parental overriding system.

As is understood, however, instead of entirely static styles, it is alternatively feasible to have at least some styles that are dynamic, or to use multiple sets of styles. At a tradeoff of performance, a view tree can have a style recomputed or reapplied for it. Such a non-performant change may be used on a relatively infrequent occasion, for example, such as to re-compute the view tree with different view styles for daytime versus nighttime viewing. This infrequent re-computation may be more efficient than specifying different transition style values for a large number of views based upon the time of day, or based upon the current lighting conditions. Note however that in this example, two sets of static styles may exist to represent the two states of daytime or nighttime, with the factory simply selecting one or the other style as appropriate. Thus, the set of styles can still be considered static/fixed, at least substantially.

Notwithstanding, statically defining a single style to represent multiple states (e.g., the focused state versus the unfocused state) including any "dynamic" styleable transitions affords greater opportunities to pre-compute effective styles because the set of effective styles is finite, given that they are statically defined. (In contrast, CSS has completely and commonly dynamic set of styles applied to a DOM, even though the styles themselves are mostly static. In the focused versus non-focused example above, using a CSS/DOM system, there is likely one style to represent the unfocused state, and another style when focused to represent the focused state. Each time the set of styles on an element changes the system re-computes the effective style, which on a highly frequent action such as a focus change is highly inefficient.) Moreover, the set of possible combinations in a CSS/DOM system is not known statically, in contrast to the styling technology described herein.

As can be seen, the technology described herein provides a styling system that delivers a high degree of flexibility, composability, and performance.

One or more aspects are directed towards receiving a request for a view instance, the request associated with an identifier set comprising one or more identifiers. An unstyled view object and a style are located based upon the identifier set, in which the style comprises a set of property values for the unstyled view object. By applying the set of property values to the unstyled view object, a styled view object comprising the view instance is constructed. The view instance is returned in response to the request. The style may be generated prior to using the style during runtime.

The identifier set may comprise a factory identifier (ID) received at a view factory; locating the unstyled view object may include selecting the unstyled view object based upon the factory ID and locating the style using the factory ID as a mapping to the style. The identifier set may comprise a factory ID and an object ID, and locating the style may comprise using the factory ID and the object ID as a mapping to the style.

The view instance may be cached in association with the identifier set. Upon receiving another request for another view instance having the same identifier set, the cache may be accessed to retrieve a copy of the view instance from the cache for returning the copy as the other view instance in response to the other request.

The style may include a set of property values inherited from a default property value set. The style may be generated, including by overriding one or more property values of the default property value set with an overriding property value subset that overrides at least one default property value of the default property value set. The style may include a set of property values inherited from a default property value set, a first property value subset and a second property value subset, such that generating the style includes overriding a default property value of the default property value set with a first overriding property value of the first property value subset, and overriding the first overriding property value with a second overriding property value of the second property value subset.

Generating the style may include flattening a tree of style data into a set of fixed styles that includes the style. The tree of styles may comprise a topmost node and a leaf node associated with the identifier set, the leaf node coupled to the topmost node via a path comprising zero or more intermediate nodes between the topmost node and the leaf node. Flattening the tree of styles may include inheriting a default set of the style property values from the topmost node as a current state of the style property value set, and at each intermediate node, overriding the current state set of the style property values with a subset of one or more style property values specified in that intermediate node, in a top-down ordering, to provide an updated current state of the property value set to each lower intermediate node and then to the leaf node. Flattening the tree also may include overriding the current state of the style property value set with a subset of one or more style property values from the leaf node, and saving the current state of the property value set as the style associated with the identifier set. An intermediate node may be associated with a different identifier set comprising one or more different identifiers, such that flattening the tree of styles may include saving the current state of the property value set at that intermediate node as a different style associated with the different identifier set.

One or more aspects are directed towards a styling system including a set of two or more styles, each style comprising property values mapped to an identifier set, each style corresponding to a default property value set as overridden by any more specific style data specified for that identifier set. A style is applied by a constructor entity to create an object instance from an unstyled object that corresponds to the identifier set.

The set of styles may be fixed for a runtime session. A style generator may be used to generate the styles by processing code that specifies the style data and/or by processing a tree that represents the style data.

The unstyled object may be an unstyled view object of a user interface, and the style property values may include color value data, font data, border data, position data, and/or animation-related data. The unstyled object may comprise an unstyled view object of a user interface, and the style property values may include transition data that is used for the view object based upon a state of the view object.

The constructor entity may comprise an object factory that uses the identifier set to determine which unstyled object and style to use to create the object instance. The identifier set may be used to distinguish between different view styles for a view type.

One or more aspects are directed towards generating a set of styles, each style comprising a set of property values with at least one property value corresponding to the appearance of a view associated with that style. The set of styles are maintained, for applying a style from the set of styles to an associated view, comprising an unstyled view object, to create a styled view instance for rendering.

Applying the style from the set of styles to the associated view may be based upon receiving a request for the styled view instance at a runtime constructor entity, in which the request includes an identifier set. The style may be located from the set of styles based upon the identifier set, and used to set property values in the unstyled view to create the styled view instance.

The set of styles may be maintained by saving a fixed set of styles during a loading or compiling operation.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
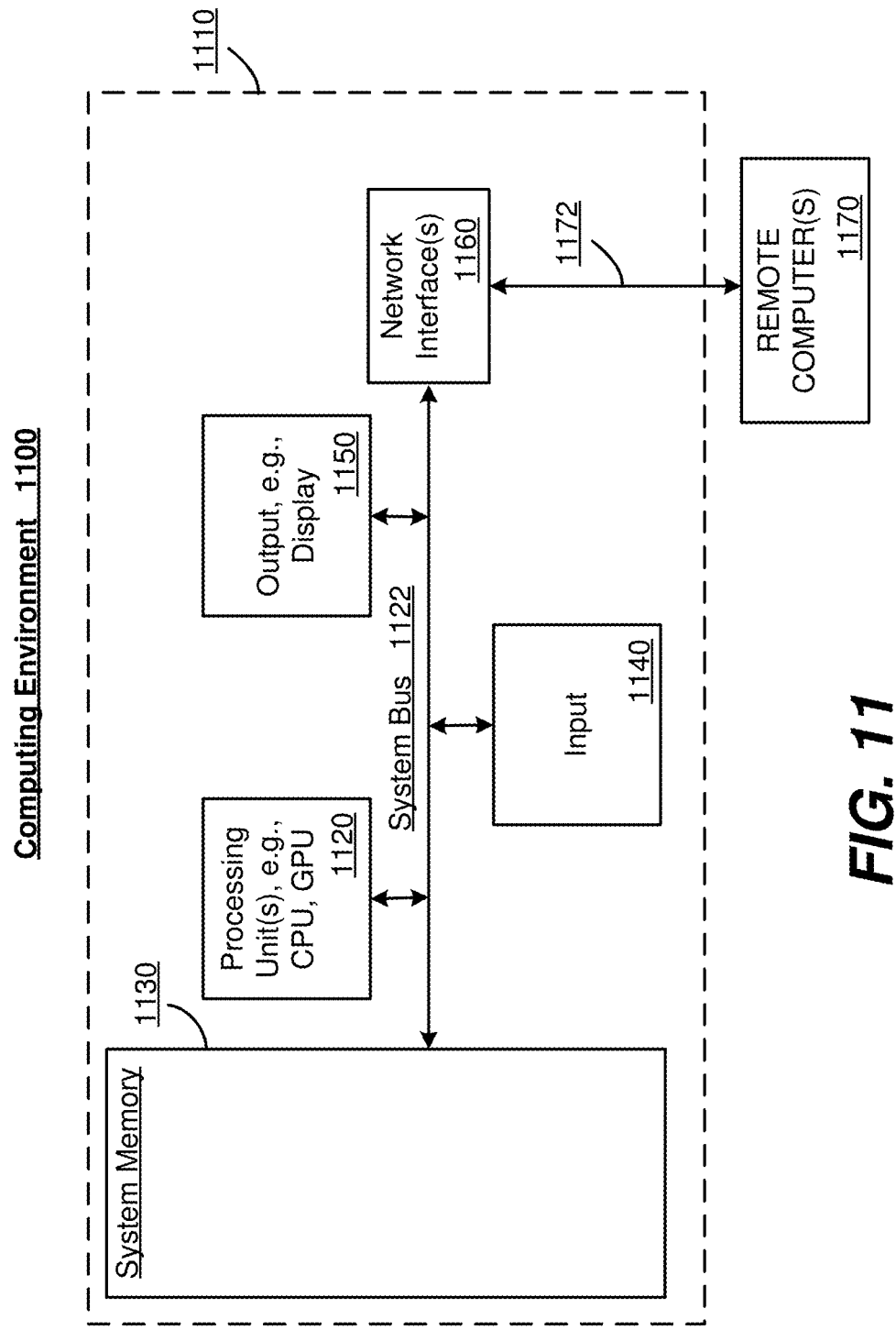
FIG. 11 is a block diagram representing an example computing environment into which aspects of the subject matter described herein may be incorporated.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/ buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a processor; and
   a memory that stores executable instructions which, when executed by the processor, facilitate performance of operations, the operations comprising:
   selecting a child node in a hierarchical tree of styling data;
   determining a path from the child node to a higher default node in the hierarchical tree; and
   flattening the hierarchical tree with respect to the path into fixed sets of style property values, comprising traversing the path to obtain style property data from nodes in the path and generating a set of static style property values associated with the child node, wherein the generating comprises:
   in response to identifying an override blocking flag that is set at a node in the path, blocking overriding of common style property values obtained from parent nodes in the path up to the node by style property values obtainable from child nodes in the path below the node.

2. The system of claim 1, wherein the selecting the child node in the hierarchical tree comprises obtaining a view object associated with a program, wherein the view object is associated with a node identifier of the child node, and selecting the child node based on the node identifier.

3. The system of claim 2, wherein the operations further comprise associating the set of static style property values with the view object.

4. The system of claim 3, wherein the operations further comprise running the program, including rendering a representation of an instance of the view object based on the set of static style property values associated with the view object.

5. The system of claim 1, wherein the selecting the child node in the hierarchical tree comprises obtaining a view object associated with a program, wherein the view object is associated with a node identifier of the child node, and wherein the flattening the hierarchical tree occurs as part of compiling the program.

6. The system of claim 1, wherein the selecting the child node in the hierarchical tree comprises obtaining a view object associated with a program, wherein the view object is associated with a node identifier of the child node, and wherein the flattening the hierarchical tree occurs as part of loading the program.

7. The system of claim 1, wherein the generating the set of static style property values associated with the child node comprises overriding at least one common style property value obtained from a higher node while traversing the path with a style property value of obtained from a lower node in the path.

8. The system of claim 1, wherein the flattening the hierarchical tree occurs as part of a compiling operation of a program.

9. A method comprising:
    accessing a hierarchical tree of styling data, in which nodes of the hierarchical tree represent style data, and child nodes override higher style data inherited from one or more higher parent nodes with child style data;
    obtaining view objects associated with a program, in which respective view objects are mapped to respective nodes in the hierarchical tree; and
    flattening the hierarchical tree, comprising traversing the hierarchical tree for the respective view objects, including, for the respective view objects, determining respective sets of static style property values obtained by traversing the hierarchical tree based on the respective mapped-to nodes, and associating the respective view objects with the respective sets of static style property values, wherein the associating comprises:
    in response to identifying an override blocking flag that is set at a node in a first traversal path of the hierarchical tree, blocking overriding of higher style data obtained from parent nodes in the first traversal path up to the node by the child style data obtainable from the child nodes in the first traversal path below the node.

10. The method of claim 9, wherein the flattening the hierarchical tree occurs as part of a compiling operation of the program.

11. The method of claim 10, further comprising running the program, including rendering representations of instances of the respective view objects based on the respective static sets of style property values to which the respective view objects are mapped.

12. The method of claim 9, wherein the flattening the hierarchical tree occurs as part of loading the program.

13. The method of claim 12, further comprising running the program, including rendering representations of instances of the respective view objects based on the respective static sets of style property values to which the respective view objects are mapped.

14. The method of claim 9, wherein the flattening the hierarchical tree comprises generating a set of static style property values for a view object, including locating a child node associated with the view object, determining a second traversal path including one or more parent nodes in the hierarchical tree relative to the child node, and obtaining style property values from the nodes in the second traversal path, in which style property values of child nodes in the second traversal path override style property values of parent nodes for style properties that are in common in the second traversal path.

15. The method of claim 14, wherein the obtaining the property values comprising merging a property value of a child node with a common existing property value in the set of static style property values by overriding the common existing property value with the property value of the child node.

16. A non-transitory machine-readable medium, comprising executable instructions that, when executed by a processor of a device, facilitate performance of operations, comprising:
    associating a hierarchical tree of styling data with a program;
    loading or compiling the program, including flattening the hierarchical tree of styling data flattening the hierarchical tree into fixed sets of style property values, the flattening comprising:
    locating a child node in the hierarchical tree of styling data based on information contained in a view object of the program;
    determining a path from the child node to a default node higher in the hierarchical tree; and
    traversing the path to obtain style property data from nodes in the path to generate a set of static style property values associated with the child node, wherein the traversing comprises:
    in response to identifying an override blocking flag that is set at a node in the path, blocking overriding of common style property values obtained from parent nodes in the path up to the node by style property values obtainable from child nodes in the path below the node; and
    associating the set of static style property values with the view object.

17. The non-transitory machine-readable medium of claim 16, wherein the operations further comprise running the program, including rendering a styled instance of the view object, comprising applying the set of static style property values associated with the view object to data of the styled instance of the view object.

18. The non-transitory machine-readable medium of claim 16, wherein the traversing the path comprises, starting with a default node of the path towards the child node, obtaining style property values for the set of static style property values, including overriding at least one common style property value in the set of static style property values obtained from a higher node in the path with a style property value obtained from a lower node in the path.

19. The non-transitory machine-readable medium of claim 16, wherein the traversing the path comprises, starting with a default node of the path towards the child node, obtaining style property values for the set of static style property values, including blocking overriding of at least one common style property value in the set of static style property values obtained from a higher node in the path by not overriding the at least one common style property value with a style property value obtainable from a lower node in the path.

20. The non-transitory machine-readable medium of claim 16, wherein the traversing the path comprises, starting with a default node of the path towards the child node, obtaining style property values for the set of static style property values, including overriding a common style property value in the set of static style property values obtained as a first style property value from a higher node in the path with a second style property value obtained from a first lower node in the path, and blocking overriding of another common style property value in the set of static style property values obtained as a third style property value from the higher node in the path by not overriding the third style property value with a fourth style property value obtainable from a second lower node in the path.

* * * * *